United States Patent
Oka

Patent Number: 6,030,307
Date of Patent: Feb. 29, 2000

[54] REAR DERAILLEUR WITH A CABLE GUIDE ROLLER

[75] Inventor: Mitsuo Oka, Sakai, Japan

[73] Assignee: Shimano, Inc.

[21] Appl. No.: 09/299,157

[22] Filed: Apr. 22, 1999

Related U.S. Application Data

[62] Division of application No. 08/774,887, Dec. 27, 1997, Pat. No. 5,904,629.

[51] Int. Cl.⁷ .................................................. F16H 55/36
[52] U.S. Cl. ........................................... 474/175; 474/179
[58] Field of Search ................................. 474/78–82, 69, 474/166, 167, 174, 175, 179, 180, 181, 198, 185, 186; 180/231; 226/172, 190, 194

[56] References Cited

U.S. PATENT DOCUMENTS

| | | | |
|---|---|---|---|
| Re. 32,059 | 12/1985 | Nagano | 474/82 |
| 3,748,916 | 7/1973 | Morse | 74/217 B |
| 3,979,962 | 9/1976 | Kebsch | 74/217 B |
| 4,306,871 | 12/1981 | Nagano | 474/82 |
| 4,413,981 | 11/1983 | White et al. | 474/94 |
| 4,437,848 | 3/1984 | Shimano | 474/82 |
| 4,470,823 | 9/1984 | Shimano | 474/82 |
| 4,496,336 | 1/1985 | Matsumoto | 474/181 |
| 4,504,022 | 3/1985 | Stang et al. | 226/190 |
| 4,580,327 | 4/1986 | Juy | 474/80 |
| 5,178,313 | 1/1993 | Lecompte et al. | 226/190 |
| 5,454,760 | 10/1995 | Aranibar | 474/166 |
| 5,624,334 | 4/1997 | Lumpkin | 474/79 |
| 5,855,529 | 1/1999 | Sugimoto | 474/80 |

FOREIGN PATENT DOCUMENTS 52-162644  12/1977  Japan.

*Primary Examiner*—David A. Bucci
*Assistant Examiner*—Matthew A. Kaness
*Attorney, Agent, or Firm*—James A. Deland

[57] ABSTRACT

A rear derailleur for a bicycle includes a base member for fixing to a bicycle frame, a movable member for supporting a chain guide, and a linkage mechanism coupling the base member to the movable member so that the movable member is capable of movement relative to the base member. A roller is coupled to the base member for rotation about a rotation axis, wherein the roller includes a cable guiding surface for guiding an inner wire of a control cable. A casing support is provided for supporting an outer casing of the control cable, and a pivot coupling pivotally supports the casing support to the base member so that the casing support pivots around a pivot axis that is spaced apart from the rotation axis.

17 Claims, 9 Drawing Sheets

REAR DERAILLEUR WITH A CABLE GUIDE ROLLER

This application is a division of application Ser. No. 08/774,887, filed Dec. 27, 1997 now U.S. Pat. No. 5,904,629.

BACKGROUND OF THE INVENTION

The present invention is directed to bicycle derailleurs and, more particularly, to a bicycle rear derailleur having a cable guide roller for controlling the orientation of a control cable.

FIG. 1 is a side view of a prior art rear derailleur disclosed in U.S. Pat. No. 4,610,644. As shown in FIG. 1, the derailleur comprises a base member 2 for rotatably mounting to a fixing member 1 of the bicycle, a movable member 5, and two linkage members 3 and 4 that connect base member 2 and movable member 5 together so that movable member 5 is capable of movement relative to base member 2. A chain guide 6 having a guide pulley 61 and a tension pulley 62 is rotatably coupled to movable member 5 for guiding a chain 17 along a plurality of sprockets of a sprocket cluster S. A first spring 13 is disposed between the movable member 5 and the chain guide 6 for biasing chain guide 6 clockwise, and a second spring 14 is disposed between the base member 2 and the fixing member 1 for biasing base member 2 clockwise.

The derailleur is operated by a control cable C of the type having an inner wire W that slides within an outer casing O. Outer casing O is supported to base member 2 through a casing support 16, and inner wire W is connected to movable member 5 through a wire connector 15. Pulling inner wire W causes movable member 5 to move axially toward the largest sprocket $S_2$ of sprocket cluster S, and releasing inner wire W causes movable member 5 to move axially toward the smallest sprocket $S_1$ of sprocket cluster S. At the same time, the first and second springs 13 and 14 balance with each other to adjust the positions of the base member 2 and movable member 5 to set the radial position of the guide pulley 61 relative to the rear sprocket assembly S. As a result, base member 2 usually exhibits reciprocating motion in the direction Z.

Since control cable C is rigidly fixed to base member 2, and since control cable C ordinarily bends approximately 180° before it attaches to the derailleur, control cable C resists the reciprocating motion of base member 2 during operation of the derailleur. This can adversely affect the proper positioning of the guide pulley 61. Furthermore, movement of base member 2 in the clockwise direction often causes the bend in control cable C to tighten, thus decreasing the efficiency of the cable due to increased friction between the inner wire W and the inner surface of the outer casing O.

SUMMARY OF THE INVENTION

The present invention is directed to a rear derailleur having a cable guide roller for controlling the orientation of a control cable and reducing the effect of cable orientation on the operation of the derailleur. In one embodiment of the present invention, a rear derailleur for a bicycle includes a base member for fixing to a bicycle frame, a movable member for supporting a chain guide, and a linkage mechanism coupling the base member to the movable member so that the movable member is capable of movement relative to the base member. A roller is coupled to the base member for rotation about a rotation axis, wherein the roller includes a cable guiding surface for guiding an inner wire of a control cable. A casing support is provided for supporting an outer casing of the control cable, and a pivot coupling pivotally supports the casing support to the base member so that the casing support pivots around a pivot axis that is spaced apart from the rotation axis. More specifically, the pivot axis of the casing support is positioned in close proximity to an outer peripheral surface of the roller. The pivoting casing support allows the casing to accommodate the reciprocating motion of the base member.

DETAILED DESCRIPTION OF THE EMBODIMENTS

Figure 2:
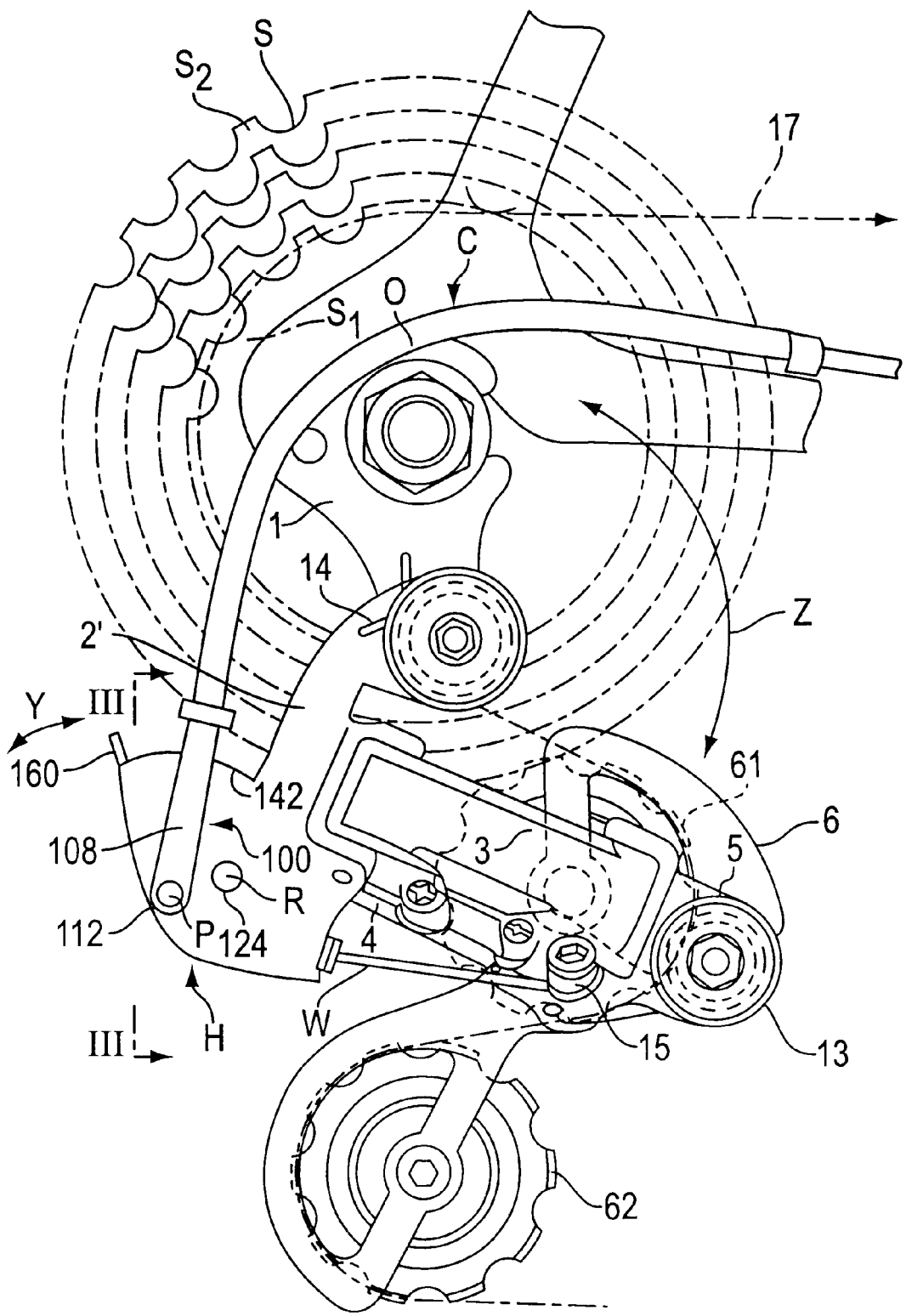
FIG. 2 is a side view of a particular embodiment of a rear derailleur according to the present invention.

FIG. 2 is a side view of a particular embodiment of a rear derailleur according to the present invention. This derailleur is constructed and operates substantially the same as the derailleur disclosed in U.S. Pat. No. 4,610,644, except for the features specifically described below. Accordingly, that patent is incorporated herein by reference.

As shown in FIG. 2, the derailleur comprises a base member 2' for rotatably mounting to a fixing member 1 of the bicycle, a movable member 5, and two linkage members 3 and 4 that connect base member 2' and movable member 5 together so that movable member 5 is capable of movement relative to base member 2'. A chain guide 6 having a guide pulley 61 and a tension pulley 62 is rotatably coupled to movable member 5 for guiding a chain 17 along a plurality of sprockets of a sprocket cluster S. A first spring 13 is disposed between the movable member 5 and the chain guide 6 for biasing chain guide 6 clockwise, and a second spring 14 is disposed between the base member 2' and the fixing member 1 for biasing base member 2' clockwise.

The derailleur is operated by a control cable C of the type having an inner wire W that slides within an outer casing O. Outer casing O is supported to base member 2' through a casing support 100, and inner wire W is connected to movable member 5 through a wire connector 15. Pulling inner wire W causes movable member 5 to move axially toward the largest sprocket $S_2$ of sprocket cluster S, and releasing inner wire W causes movable member 5 to move axially toward the smallest sprocket $S_1$ of sprocket cluster S. At the same time, the first and second springs 13 and 14 balance with each other to adjust the positions of the base member 2' and movable member 5 to set the radial position of the guide pulley 61 relative to the rear sprocket assembly S. As a result, base member 2' usually exhibits reciprocating motion in the direction Z.

Figure 1:
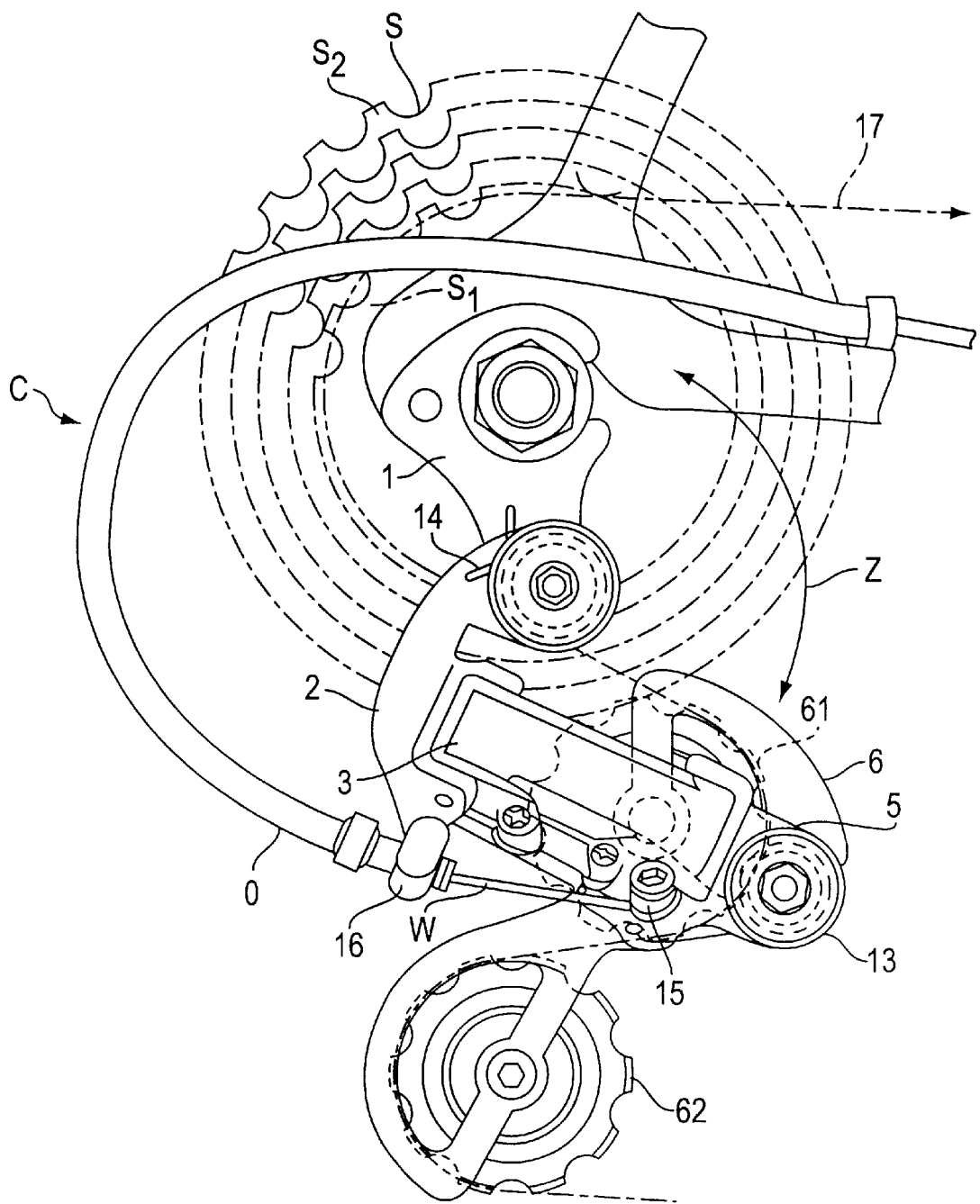
FIG. 1 is a side view of a prior art derailleur.
Figure 3:
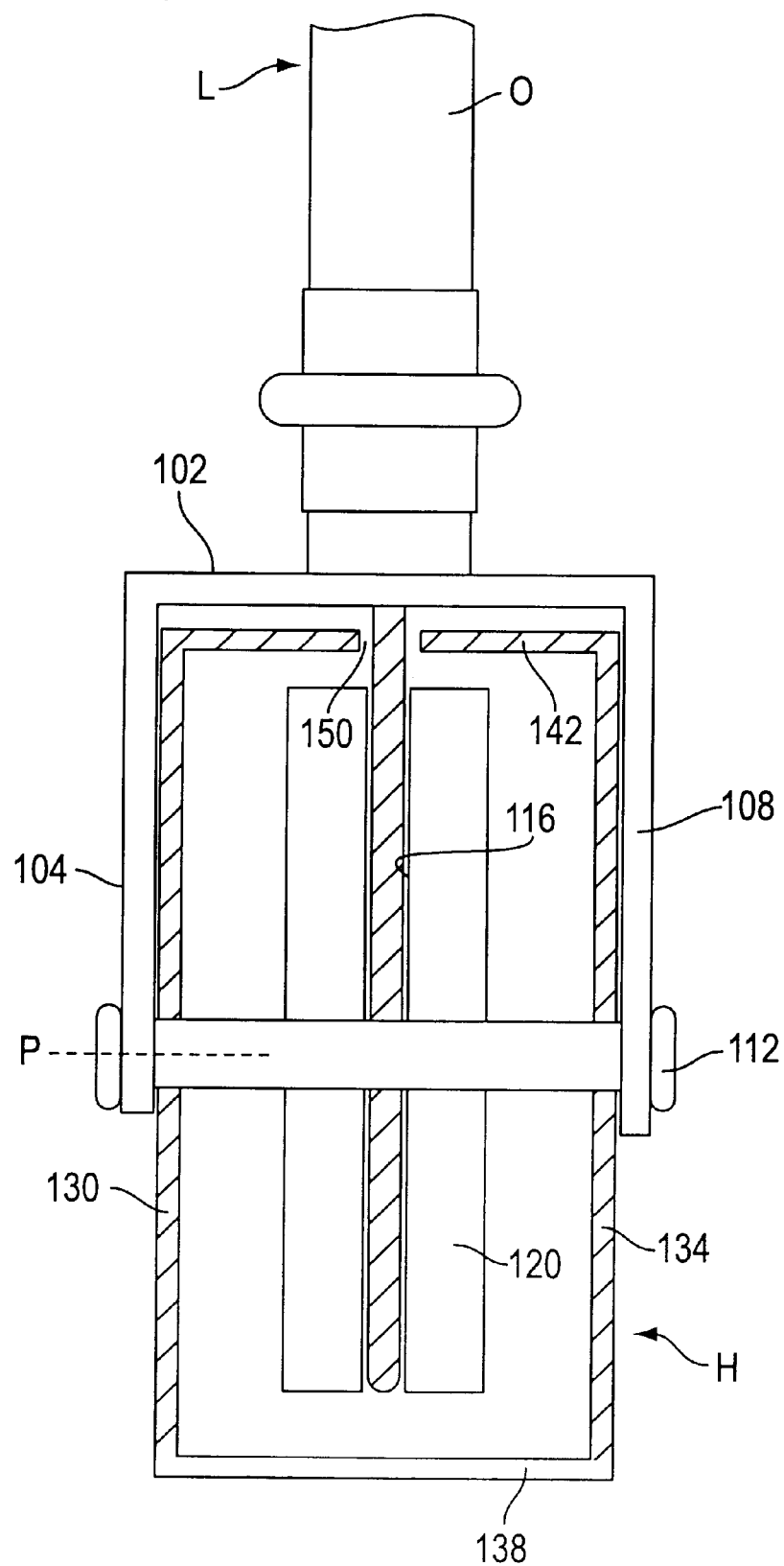
FIG. 3 is a view taken along line III—III in FIG. 2.

Unlike the derailleur described in FIG. 1, casing support 100 is not immovably fixed to base member 2'. Instead, casing support 100 comprises a casing support member 102 (FIG. 3) connected to legs 104 and 108 that are coupled to a pivot shaft 112 in a parallel relationship to each other so that casing support 100 pivots around a pivot axis P. Furthermore, inner wire W does not extend directly in a straight line from casing support member 102 to wire connector 15. Instead, inner wire W is guided around a surface 116 of a guide roller 120 that is supported to base member 2' by a shaft 124 (FIG. 2) for rotation about a rotation axis R. In this embodiment, surface 116 is formed as a groove for entraining inner wire W.

To avoid contamination of roller 120 and inner wire W, base member 2' includes a mounting member for roller 120 and casing support 100 in the form of side surfaces 130 and 134, a bottom surface 138 and a top surface 142 which form a housing H for substantially enclosing roller 120. Legs 104 and 108 of casing support 100 extend along the side surfaces 130 and 134, respectively. Top surface 142 defines a slot 150 for receiving inner wire W therethrough so that inner wire W may reciprocate in the direction Y shown in FIG. 2. To keep the exposed portion of inner wire W constant and at a minimum, the top surface 142 is formed as a curved surface having a constant radius of curvature originating at pivot shaft P. A stopper 160 is disposed at one end of top surface 142 to limit the range of motion of cable support 100 and prevent inner wire W from rubbing against the edge of slot 150.

The pivoting construction of casing support 100 allows control cable C to assume a less curved orientation for reducing the friction between inner wire W and outer casing O.

Also, when the derailleur moves axially relative to sprocket cluster S and base member 2' reciprocates in the direction Z, casing support 100 will pivot so as to minimize the resistance to the reciprocating motion of base member 2'.

Figure 4:
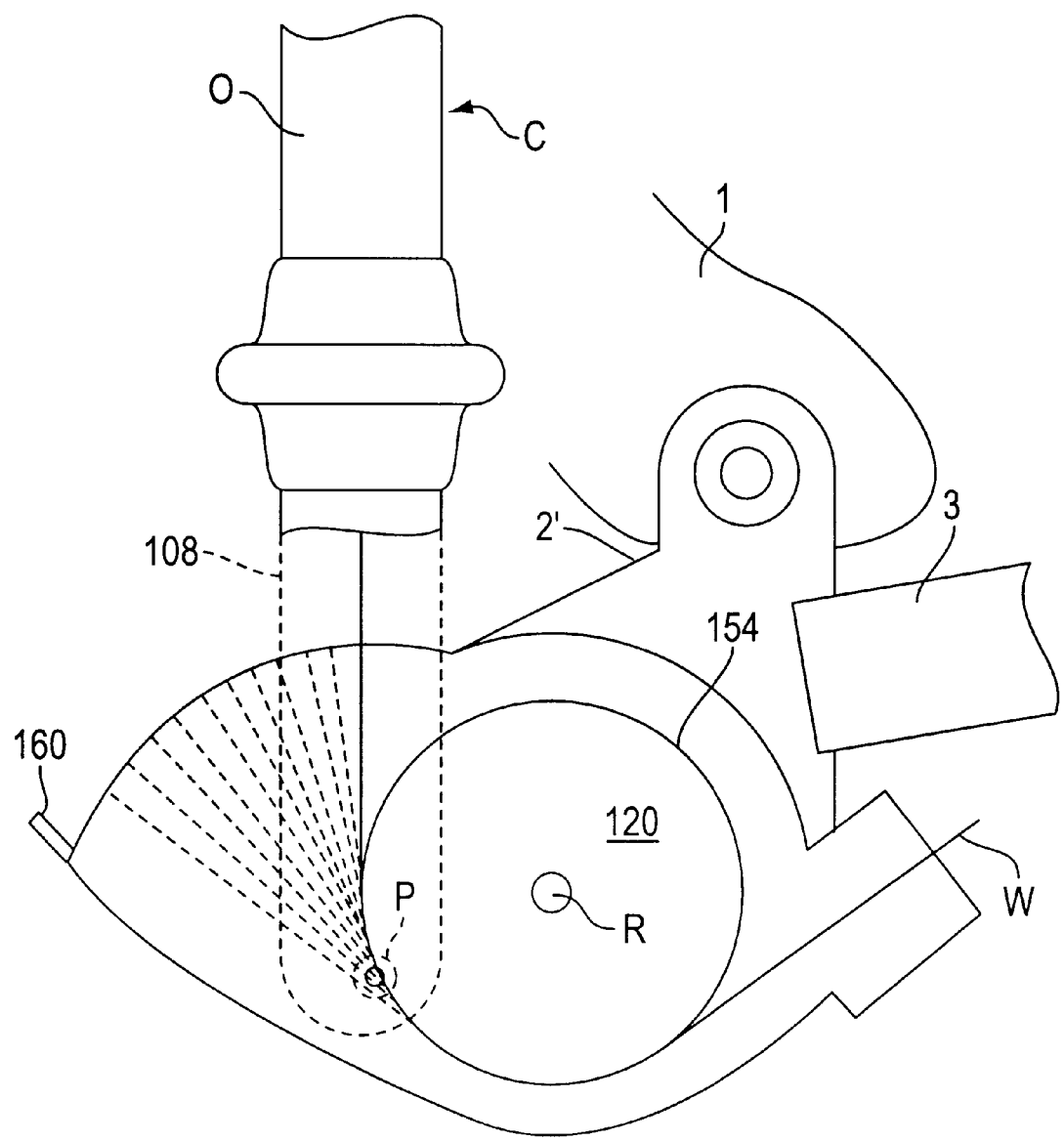
FIGS. 4 and 5 are detailed views showing the operation of the cable casing support shown in FIG. 2.
Figure 5:
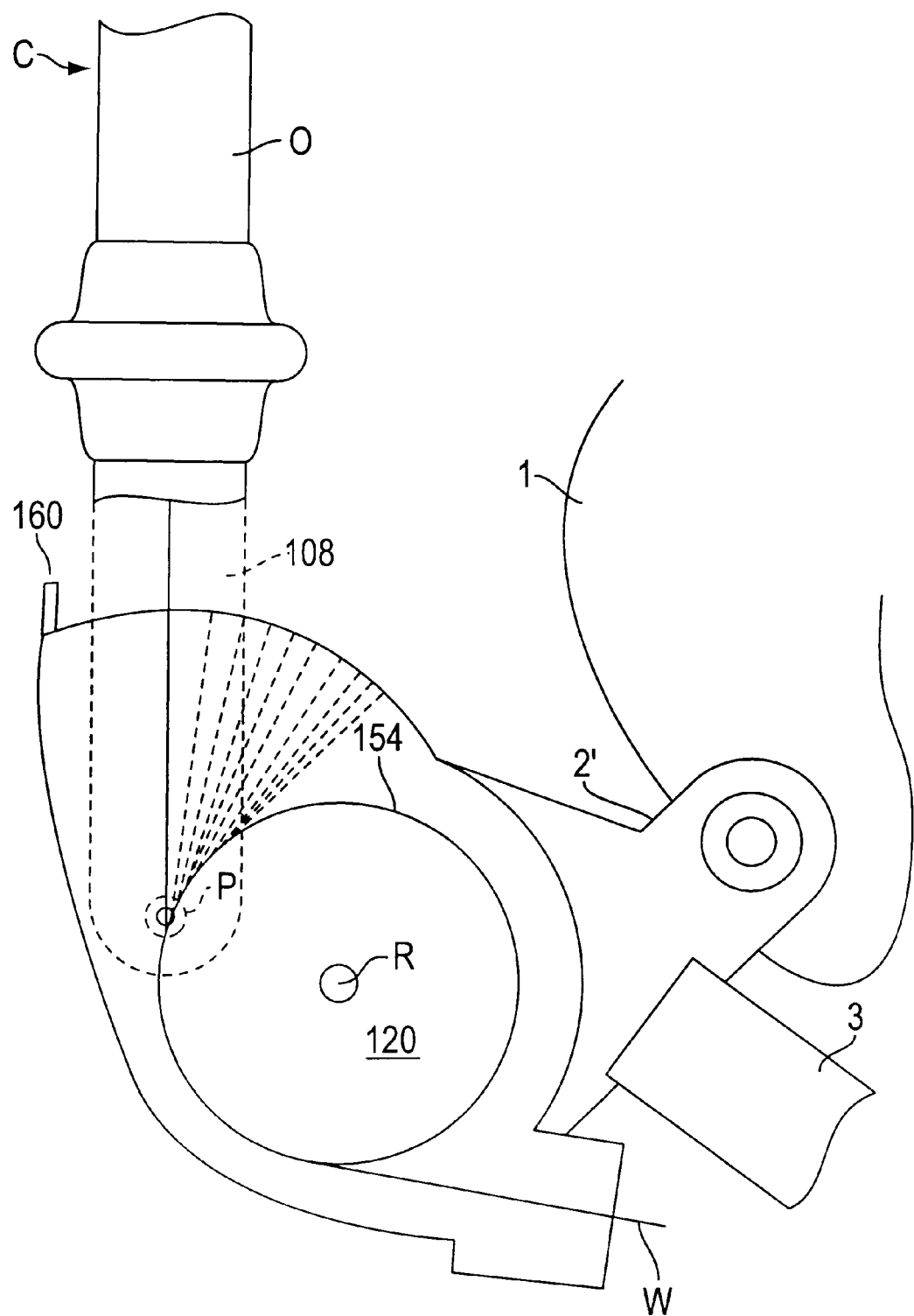

As shown more specifically in FIGS. 4 and 5, pivot axis P of casing support 100 is spaced apart from the rotational axis R of roller 120 and, in this embodiment, is positioned in close proximity to or directly aligns with the outer peripheral surface 154 of roller 120. This positional relationship helps ensure that inner wire W exits outer casing in a smooth direction. Indeed, when pivot axis P is aligned at the outer peripheral surface 154 of roller 120 then inner wire W exits outer casing O without bending at all, and this positional relationship will be maintained throughout the range of motion of casing support 100.

Figure 6:
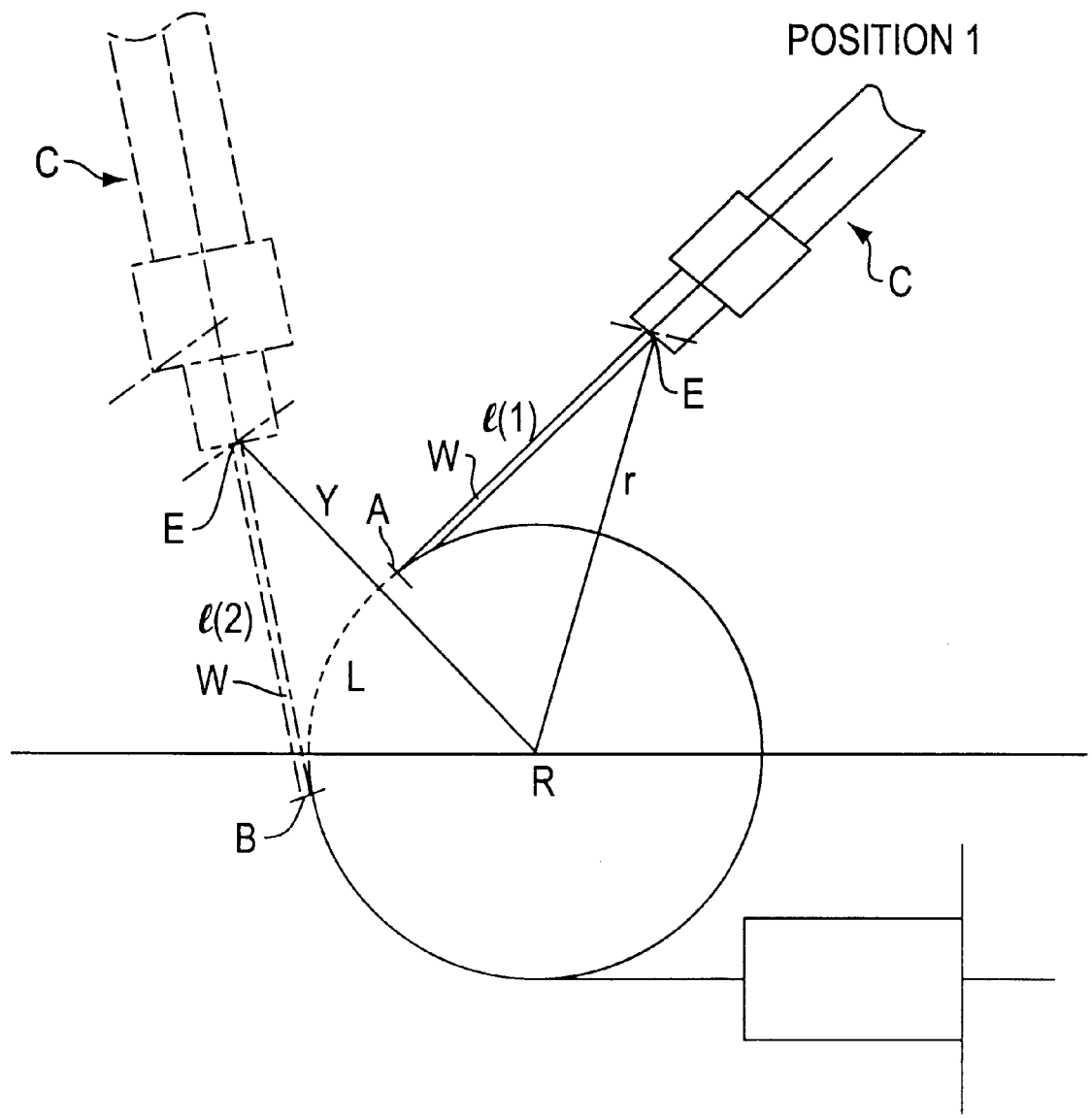
FIG. 6 is a detailed view showing the operation of a cable casing support that pivots around the rotation axis of the cable guide roller.

Another very important advantage of locating the pivot axis P of casing support 100 away from the rotational axis R of roller 120, and particularly when the pivot axis P is positioned as described above, may be understood by referring to FIG. 6. FIG. 6 is a schematic view showing the orientation of the control cable C if the casing support were to pivot around the rotation axis R of the cable guide roller at a constant radius r. The actual casing support is omitted for clarity.

Assume the chain 17 engages one of the sprockets, e.g., sprocket $S_1$, in the sprocket cluster S. At this time, springs 13 and 14 balance with each other to properly position the guide pulley 61 relative to sprocket $S_1$, and the casing support orients control cable C in position 1. In this position, inner wire W extends a distance l(1) from the exit location E of control cable C to the contact location A on the cable guide roller. Assume the cyclist maintains the chain around sprocket $S_1$ but decides to switch the chain to a smaller front chainwheel (not shown in the drawings). After the cyclist shifts to the smaller chainwheel, more of the chain 17 needs to be taken up by the derailleur. This is accomplished by a combination of clockwise movements of base member 2 and chain guide 6. As a result of these movements, springs 13 and 14 balance with each other so that the casing support orients control cable C in position 2. In this position, inner wire W extends a distance l(2) from the exit location E of control cable C to the contact location B on the cable guide roller.

Since the inner wire W is tangent to the cable guide roller, l(1)=l(2). However, the length of inner wire W is not constant with respect to a fixed point on the cable guide roller. For example, the length of inner wire W from exit location E to the location B in position 1 is (l(1)+the distance L around the outer periphery of the cable guide roller), whereas the length of inner wire W from exit location E to the location B in position 2 is only l(2). Thus, the length L of inner wire W also must be taken up as the control cable C moves from position 1 to position 2. Since the length L will vary depending upon the size of the chainwheels and the selected sprocket in the sprocket cluster S, springs 13 and 14 may not always balance properly. In the present invention, however, the pivot axis P of casing support 100 is positioned away from the rotational axis R of roller 120. This, in turn, decreases the distance L to make the balance of the springs 13 and 14 more predictable. When the pivot axis P of casing support 100 is positioned in close proximity to or directly aligns with the outer peripheral surface 154 of roller 120, then the length L can be eliminated entirely. This occurs because the exit location E moves away from the cable guide roller as the cable moves from position 1 to position 2 so that l(1)+L=l(2).

Figure 7:
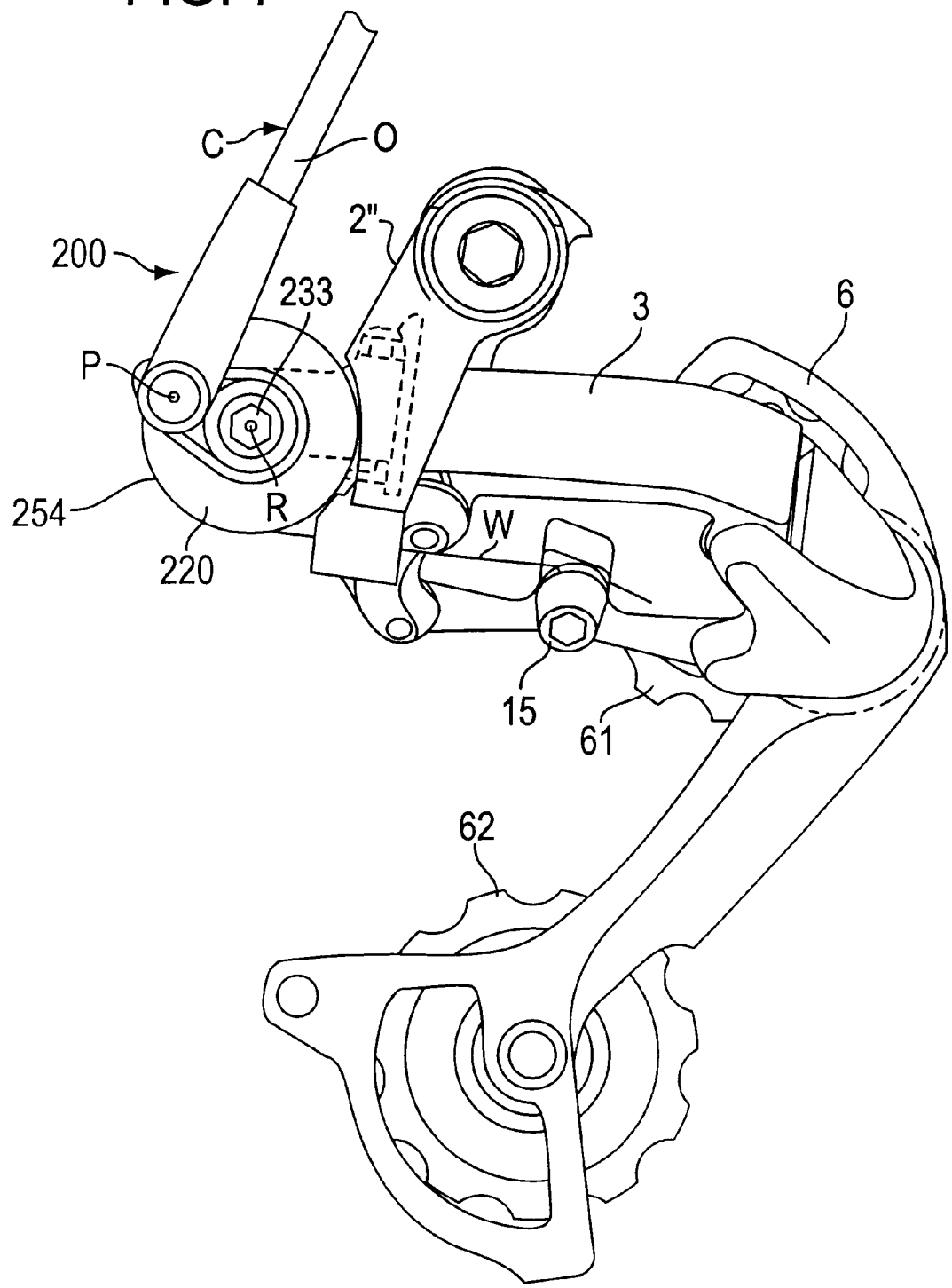
FIG. 7 is a side view of an alternative embodiment of a rear derailleur according to the present invention.
Figure 8A:
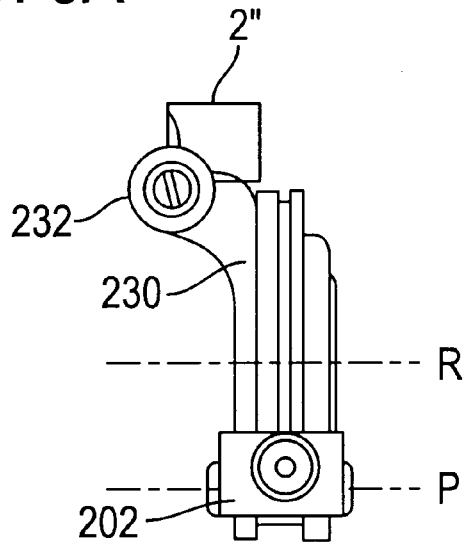
FIGS. 8A–8B are top and rear views of the guide roller and cable support components shown in FIG. 7.
Figure 8B:
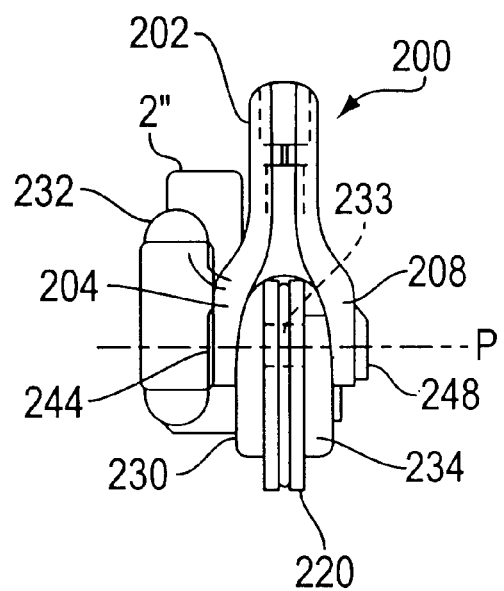

FIG. 7 is a side view of an alternative embodiment of a rear derailleur according to the present invention. In this embodiment, a cable guide roller 220 is mounted to a base member 2" in an exposed manner. As shown in FIGS. 7, 8A and 8B, a mounting member in the form of a side plate 230 is hingedly connected to base member 2" through a hinge pin 232, and another side plate 234 is connected to hinge plate 230 through a connecting pin 233 which also rotatably supports guide roller 200. As in the embodiment shown in FIG. 2, a casing support 200 comprises a casing support member 202 connected to legs 204 and 208. Leg 204 is pivotally attached to side plate 230 through a rivet 244, and leg 208 is pivotally attached to side plate 234 through a rivet 248 so that casing support 200 pivots around a pivot axis P that is paced apart from the rotational axis R of roller 220. Also, in this embodiment pivot axis P is positioned in close proximity to or directly aligns with an outer peripheral surface 254 of roller 220. This embodiment operates in the same manner as the embodiment shown in FIG. 2.

Figure 9B:
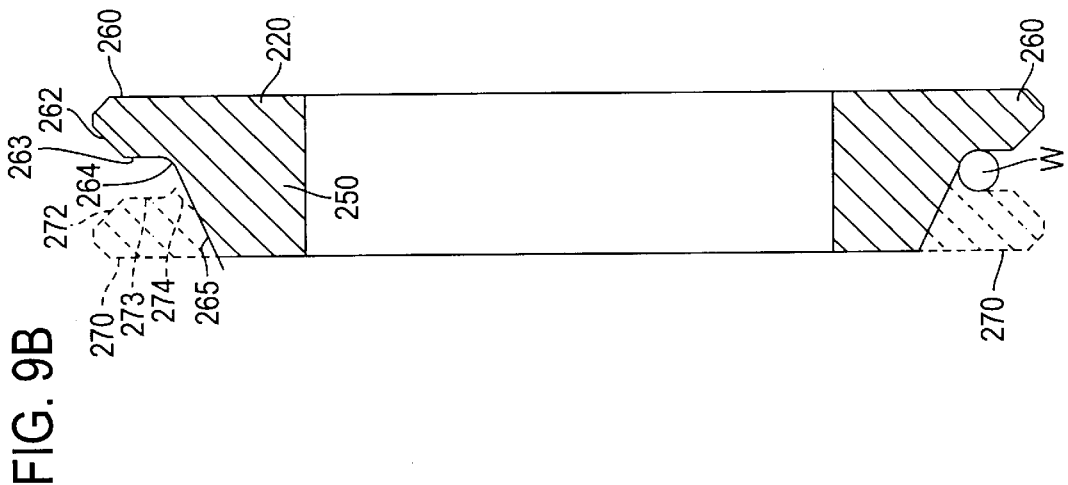
FIGS. 9A–9B are a side view and a rear cross sectional view of the cable guide roller shown in FIG. 7.
Figure 9A:
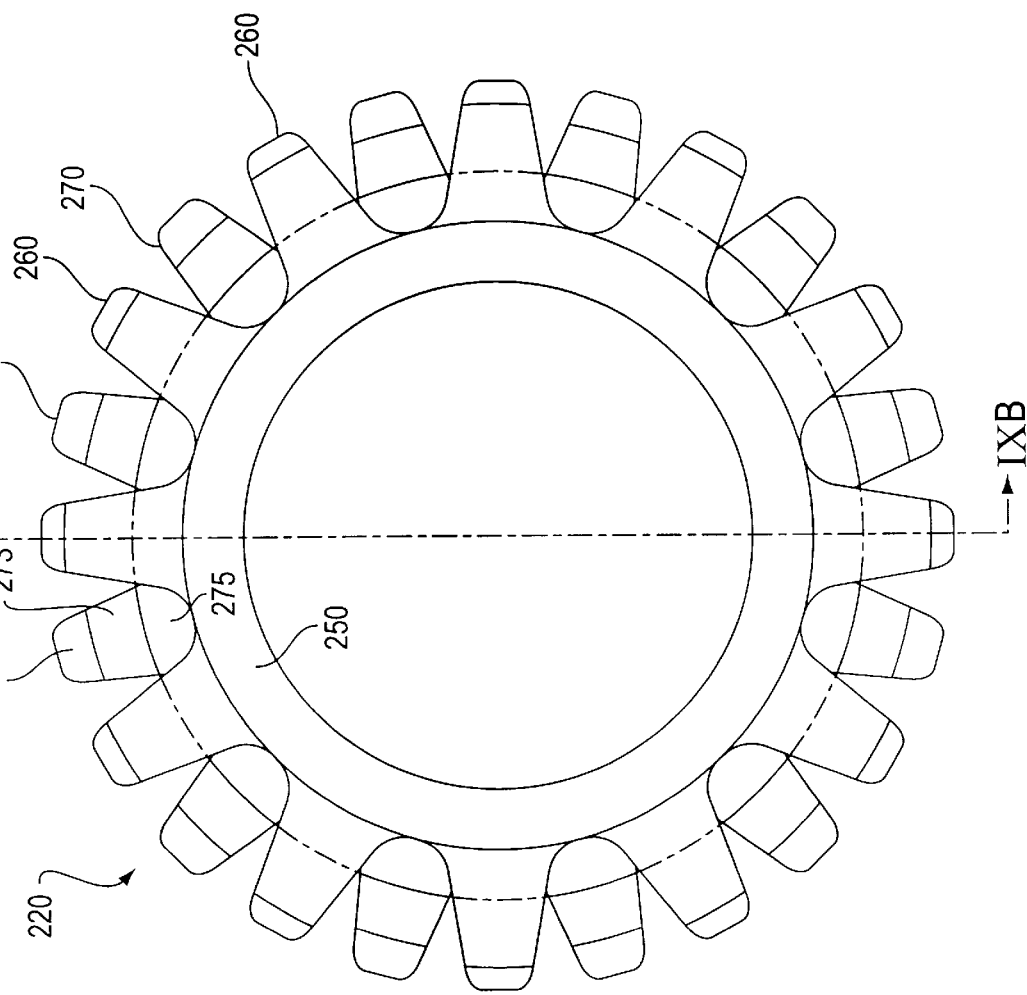

Since roller 220 is exposed, there is a risk of mud or dirt build up on the roller. To minimize the effect of such build up, roller 220 is constructed as shown in FIGS. 9A and 9B. As shown in those Figures, roller 220 comprises an annular base member 250, a plurality of roller teeth 260 extending radially outwardly from one axial side of base member 250 (i.e., on the right side in FIG. 9B), and a plurality of roller teeth 270 extending radially outwardly from the other axial side of base member 250 (i.e., on the left side in FIG. 9B). As shown in FIG. 9A, the plurality of roller teeth 260 alternate with the plurality of roller teeth 270 when viewed from the side. As shown in FIG. 9B, each roller tooth 260 includes an inclined upper inner surface 262, a middle side surface 263 having a curved portion 264, and a lower side surface 265. Similarly, each roller tooth 270 includes an inclined upper inner surface 272, a middle side surface 273 having a curved portion 274, and a lower side surface 275.

The curved portions 264 and 274 are curved to the shape of inner wire W so that the curved portions 264 and 274 alternatingly form an entrainment surface for inner wire W.

When roller 220 is exposed to contamination (mud, water, etc.), inner wire W pushes the contaminant downward toward the lower side surfaces 265 and 275. The contaminant then can exit the exposed sides of roller 250 so as not to significantly affect the operation of the derailleur.

The hinged construction of side plate 230 allows the roller assembly to pivot if the derailleur is subjected to a shock (for example, if the bicycle falls down). However, if desired, roller 220 may be removed entirely by removing hinge pin 232 and discarding the entire roller assembly. Then the outer casing O of control cable C may be inserted into a casing support 16' that is attached to or formed as one piece with base member 2'' so that the derailleur operates like the prior art derailleur shown in FIG. 1.

While the above is a description of various embodiments of the present invention, further modifications may be employed without departing from the spirit and scope of the present invention. For example, the size, shape and orientation of the various components may be changed as desired for the particular application. See, for example, the different locations of wire connector 15 and 15' in FIGS. 2 and 7. If desired, side plate 230 may be formed as one piece with base member 2'', and a regular roller may be used in the embodiment shown in FIG. 7 when the derailleur is not intended to be used in harsh environments. A housing similar to the housing H in FIG. 3 or other cover may be provided for the embodiment shown in FIG. 7 for additional protection. The pivot connection of casing support in both embodiments may be substituted with a casing support member that slides along a surface such as surface 142 in FIG. 2. Thus, the scope of the invention should not be limited by the specific structures disclosed. Instead, the true scope of the invention should be determined by the following claims.

What is claimed is:

1. A cable guide roller for guiding a control cable wire comprising:

a base member having a rotational axis;

a plurality of first roller teeth extending radially outwardly from a first axial side of the base member, wherein each of the plurality of first roller teeth forms a radially outermost free end unconnected from any of the other first roller teeth;

a plurality of second roller teeth extending radially outwardly from a second axial side of the base member, wherein each of the plurality of second roller teeth forms a radially outermost free end unconnected from any of the other second roller teeth;

wherein the plurality of first roller teeth are spaced apart from the plurality of second roller teeth in a direction of the rotational axis for forming a cable guide therebetween.

2. The cable guide roller according to claim 1 wherein the plurality of first roller teeth alternate with the plurality of second roller teeth when viewed in a direction of the rotational axis.

3. The cable guide roller according to claim 1 wherein the base member comprises an annular member.

4. The cable guide roller according to claim 1 wherein a first tooth of the plurality of first roller teeth includes:

an upper inner side first surface; and a middle inner side first surface having a curved portion for entraining the control cable wire.

5. The cable guide roller according to claim 4 wherein the upper inner side first surface is inclined relative to the rotational axis.

6. The cable guide roller according to claim 4 wherein the first tooth further includes a lower inner side first surface, wherein the middle inner side first surface is disposed between the upper inner side first surface and the lower inner side first surface.

7. The cable guide roller according to claim 6 wherein the lower inner side first surface is inclined relative to the rotational axis.

8. The cable guide roller according to claim 7 wherein the upper inner side first surface is inclined relative to the rotational axis in a same direction as the lower inner side first surface.

9. The cable guide roller according to claim 4 wherein a second tooth of the plurality of second roller teeth includes:

an upper inner side second surface; and a middle inner side second surface having a curved portion for entraining the control cable wire.

10. The cable guide roller according to claim 9 wherein the plurality of first roller teeth alternate with the plurality of second roller teeth when viewed in a direction of the rotational axis.

11. The cable guide roller according to claim 1 wherein each of the plurality of first roller teeth includes:

an upper inner side first surface; and a middle inner side first surface having a curved portion for entraining the control cable wire.

12. The cable guide roller according to claim 11 wherein each of the plurality of second roller teeth includes:

an upper inner side second surface; and a middle inner side second surface having a curved portion for entraining the control cable wire.

13. The cable guide roller according to claim 12 wherein each upper inner side first surface is inclined relative to the rotational axis, and wherein each upper inner side second surface is inclined relative to the rotational axis.

14. The cable guide roller according to claim 12 wherein each of the plurality of first roller teeth further includes a lower inner side first surface, wherein the middle inner side first surface is disposed between the upper inner side first surface and the lower inner side first surface, wherein each of the plurality of second roller teeth further includes a lower inner side second surface, and wherein the middle inner side second surface is disposed between the upper inner side second surface and the lower inner side second surface.

15. The cable guide roller according to claim 14 wherein each lower inner side first surface is inclined relative to the rotational axis, and wherein each lower inner side second surface is inclined relative to the rotational axis.

16. The cable guide roller according to claim 15 wherein each upper inner side first surface is inclined relative to the rotational axis in a same direction as each lower inner side first surface, and wherein each upper inner side second surface is inclined relative to the rotational axis in a same direction as each lower inner side second surface.

17. The cable guide roller according to claim 16 wherein the plurality of first roller teeth alternate with the plurality of second roller teeth when viewed in a direction of the rotational axis.

* * * * *

UNITED STATES PATENT AND TRADEMARK OFFICE
CERTIFICATE OF CORRECTION

PATENT NO. : 6,030,307
DATED : February 29, 2000
INVENTOR(S) : Mitsuo Oka

It is certified that error appears in the above-identified patent and that said Letters Patent is hereby corrected as shown below:

On the title page,
    Related U.S. Application Data should read:

Division of application No. 08/774,887, Dec. 27, 1996, Pat. No. 5,904,629.

Signed and Sealed this

Fifteenth Day of August, 2000

Attest:

Q. TODD DICKINSON

Attesting Officer          Director of Patents and Trademarks